J. W. BLACKLEDGE.
SHOCK ABSORBER.
APPLICATION FILED DEC. 26, 1917.
1,393,938.
Patented Oct. 18, 1921.
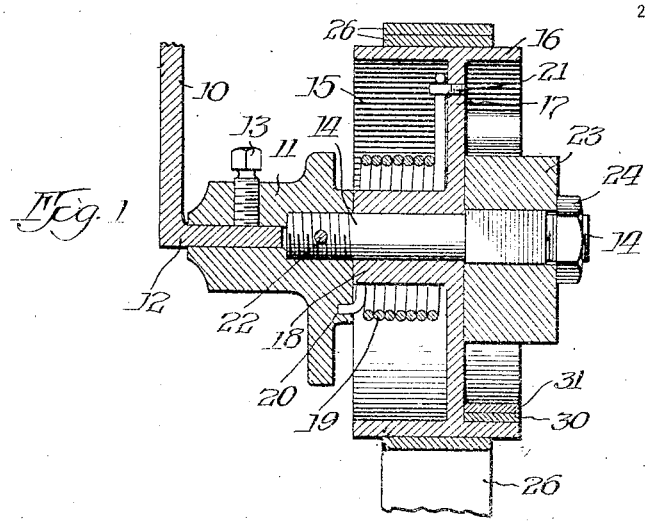
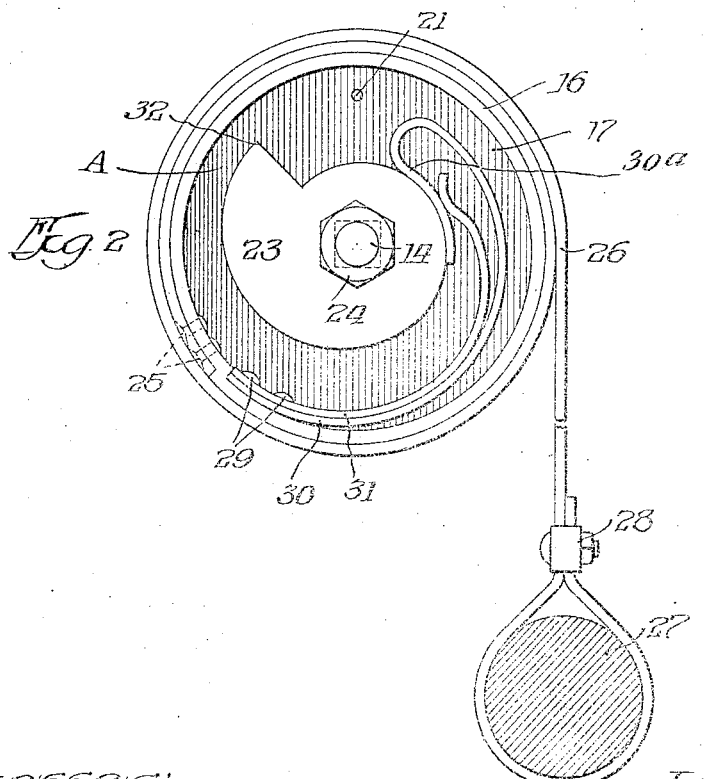

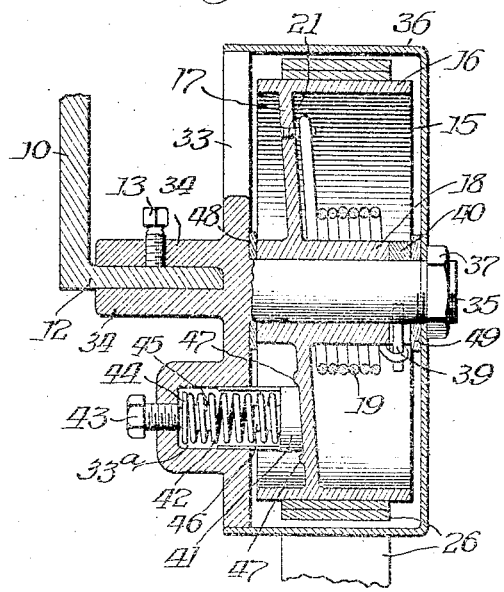

UNITED STATES PATENT OFFICE.

JOHN W. BLACKLEDGE, OF CHICAGO, ILLINOIS.

SHOCK-ABSORBER.

1,393,938.      Specification of Letters Patent.      Patented Oct. 18, 1921.

Application filed December 26, 1917. Serial No. 208,731.

*To all whom it may concern:*

Be it known that I, JOHN W. BLACKLEDGE, a citizen of the United States, residing at Chicago, in the county of Cook and State of Illinois, have invented certain new and useful Improvements in Shock-Absorbers, of which the following is a specification.

My invention relates to shock absorbers, and has for its particular object the provision of means whereby the vibration is reduced and jolting removed in vehicles, and is adapted particularly for automobiles.

Another object of my invention is the provision of a shock absorber which can be easily attached to a vehicle, is simple and efficient in operation, and is adapted to be applied to any make or manufacture of machine.

Another and further object of my invention is the provision of a shock absorber wherein the shocks incident to the reaction of the springs will be taken up, while there will be no resistance against the compression of the springs.

My invention also provides for an increased resistance as the distance traveled by the springs on the recoil movement increases.

A further object of my invention is the provision of adjusting means in the shock absorber, whereby the resistance can be increased or diminished at will, and will also permit the springs of the vehicle to be freely compressed but which will resist the rebound or recoil of the springs from any degree of compression.

My invention will be further and better understood by reference to the accompanying drawings, in which—

Figure 1 is a vertical sectional view through the center of my improved shock absorber;

Fig. 2 is a side elevation showing the cam and spring arrangement of one form of my invention;

Fig. 3 is a vertical sectional view showing a modified form of my invention;

Fig. 4 is a vertical sectional view on the line 4—4 of Fig. 5 showing a slightly different arrangement of the form shown in Fig. 3; and Fig. 5 is a side elevation on line 5—5 of Fig. 4.

Referring now specifically to the drawings, and in which like reference characters refer to like parts throughout, 10 is a section of the frame of an automobile, and 11 is a bracket attached to the flange 12 of the automobile frame by means of a bolt 13 having threaded engagement with the bracket 11. Rotatably mounted upon a spindle 14 is a drum 15. The drum 15 consists of a rim portion 16, a web portion 17, and a hub 18. Around the hub portion 18 of the drum 15 is placed a spring 19, which may be either a torsion or clock spring, one end of which is inserted in an aperture 20 in the bracket 11, the other end of the spring being attached to a pin 21 inserted in an aperture in the outer portion of the web 17 of the drum 15.

The spindle 14 is held in threaded engagement with the bracket 11 and as an additional means of securing said spindle 14 in position and against rotation a pin 22 is inserted therethrough which also passes through an aperture in the bracket 11. Toward the outer end of the spindle 14 is mounted a cam member 23, the portion of the spindle 14 upon which the cam member 23 is mounted being square to prevent rotation of the cam member 23. Having threaded engagement with the outer end of the spindle 14 is a nut 24 which holds the cam member 23 and the drum 15 securely in position. Secured to the rim 16 of the drum 15 by means of rivets 25, 25, or other suitable means is a flexible strap 26 which encircles the drum 15 two or more times as may be desired, the end of the strap 26 being looped and fastened around the axle 27 of an automobile or to some other portion of the vehicle by any suitable fastening means, as 28. Attached to the inside of the rim 16 by means of rivets 29, 29, is a leaf spring 30, the free end of which is turned backward and is curved so as to conform to the outside contour of the cam member 23 and bears against the outside surface of the cam member. Attached to the rim 16 of the drum 15 by means of the rivets 29, 29, which secure the spring 30 in position is another leaf spring 31, the free end of which is in frictional engagement with the folded end of the spring 30 and serves to increase the friction between the cam 23 and the spring 30. The cam 23 has an offset or shoulder portion 32, which, when the shock absorber is being applied to the machine, will abut against the folded end of the spring 30, thus preventing the spring 19 from revolving the drum 15 indefinitely when the device is not in use or the drum is left unrestrained.

The effect of folding the end of the spring 30 upon itself is to develop a brake shoe 30ᵃ and to increase the radial resiliency thereof. It will be seen that the salient point of the cam 23 is so related to the wall 16 of the drum that it develops a space A between the cam and the wall which is less than the radial dimension of the spring 30 at the brake shoe 30ᵃ, so that this folded end will crowd into the space A if the drum rotates a sufficient distance or if there is an extensive rebound of the vehicle body, and thereby develop a yielding or shock absorbing limiting stop in the action of the absorber. The folded ends 30ᵃ of spring 30 also afford an advantageous bearing for the reinforcing blade 31.

The drum 15 may also be rotated so as to wind up the spring 19 to any degree of tension prior to the attachment of the device to an automobile, or afterward by unfastening the strap 26 and giving it another turn around the drum. Should the strap 26 become broken, the folded free end of the spring 30 would abut against the shoulder 32, preventing the drum 15 from revolving.

It will thus be seen that as the springs of an automobile are compressed the drum 15 will revolve by reason of the force exerted upon it by the spring 19, keeping the strap 26 taut at all times until the extreme point of compression of the springs is reached, and as the springs recoil the drum 15 will revolve, while the cam 23 at all times remains stationary. As the drum 15 revolves on the recoil of the automobile springs the folded end of the spring 30 will travel around the cam 23 toward the highest point of the cam, and thus the amount of friction, and consequently the amount of resistance, will be increased as the distance of the travel of the springs is increased on their recoil movement.

It is well known that the type of springs used on an automobile will never break under compression, but breakage always occurs on the rebound, and thus my invention will serve not only to lessen the shock of the recoil of the automobile springs but also to prevent breakage of the springs.

Fig. 3 shows a modified form of my invention wherein the drum 15 is mounted upon a spindle 35 formed integral with a bracket member 33, this member also having a pair of lip portions 34 adapted to fit over the flange portion 12 of the automobile frame 10. A bolt 13 is inserted through one of the portions 34 and serves to clamp the bracket member 33 to the automobile frame. A case 36 incloses the drum 15 and is held in position by means of a nut 37 having threaded engagement with the end of the spindle portion 35. The web 17 of the drum 15 is disposed angularly instead of vertically, as shown in Fig. 1. Encircling the hub portion 18 of the drum 15 is the spring 19, arranged in practically the same manner as shown in Fig. 1, one end of which is secured to the pin 21 inserted in the outside portion of the web 17 of the drum 15, the other end of the torsion spring being secured to a pin 39 inserted through a washer 40 and into the spindle 35. The spring 19 in this form is placed on the opposite side of the web 17 and differs in this regard from the form shown in Fig. 1. Encircling the drum and having one end secured to the drum in the same manner as shown in Fig. 1 is the strap 26, which passes through an opening in the case 16 and has its other end secured to the axle or to some part of the frame of an automobile. Mounted within a pocket 33ᵃ and projecting inwardly against the web 17 formed in the bracket portion 33 of the drum 15 is a brake member 41, which is held in frictional engagement with the web 17 of the drum 15 by means of a coiled spring 42. By means of a bolt 43 having threaded engagement with the bracket member 34 the desired pressure is secured upon the brake member 41. A washer 44 having a projecting portion 45 thereon around which one end of the spring 42 fits is interposed between the bolt 43 and the spring 42. The brake member 41 also has a projecting portion 46 around which the opposite end of the spring fits, and thus the spring 42 is held securely in position. Slight annular projections 47, 47, on the web 17 serve to retain the brake member 41 in proper position. A washer 48 is placed between the hub 18 and the bracket 33 on the inside, and another washer 49 is placed over the spindle 35 at its outer end and between the member 40 and the case 16.

It will thus be seen that as the drum 15 is rotated the friction on the web 17 of the drum 15 and the brake member 41 will be increased, until the drum 15 has been rotated a half turn, but I have found in practice that even under the most severe jolting and shocks the drum will travel a little more than one-third of an arc of a circle. And of course the drum can be rotated in this form until the spring 19 is under considerable tension the same as the type shown in Fig. 1.

In Figs. 4 and 5 I have shown a further modification wherein the same general arrangement of the parts as that shown in Fig. 3 is followed, with the exception that the bracket member 33 is of a slightly different form and the case 36 is omitted. In this form the web 17 of the drum 15 is vertical instead of being disposed angularly as in Fig. 3. An annular brake member 50 one end of which is secured to the web 17 by means of bolts 51, 51, the other end being free is placed alongside of the web 17, the plane of the brake member 50 being angularly disposed with respect to the plane of the web 17. Coil springs 52, 52, of suitable lengths having seats formed in the web 17 and the brake member 50 are interposed between the brake member 50 and the web 17 and hold the brake member 50 at the proper angle and also serve as cushioning means between the web 17 and the brake member 50. Having threaded engagement with the bracket 33 is a bolt 53 the head of which may be enlarged or spread in any manner desired to afford a large friction surface between the head of the bolt 53 and the brake member 50 with which it contacts. It will be understood therefore that as the drum 15 is rotated the brake member 50 will also be rotated with a constantly increasing amount of resistance until the limit of expansion of the automobile springs is reached, when the drum will return to its normal position, and of course the bolt 53 can be adjusted so as to put any degree of pressure upon the brake member 50 that may be desired.

It may be that in some instances it will be desirable to omit the friction members and rely upon the resistance of the spring which, as heretofore explained, can be set to any desired tension, and such modification I consider within the scope of my invention.

While I have described more or less precisely the details of construction, I do not wish to be understood as limiting myself thereto, as I contemplate changes in form and the proportion of parts and the substitution of equivalents as circumstances may suggest or render expedient without departing from the spirit of my invention.

What I claim is:

1. A shock absorber comprising a drum, an attaching member upon which said drum is mounted to rotate, a tension member wound upon said drum and adapted to impart rotation thereto in one direction, a spring adapted to impart rotation to the drum in the direction to rewind the tension member thereon, and coacting braking members carried, respectively, by the attaching member and the drum; said braking members being constructed to develop an increasing resistance to the rotation of the drum imparted by the unwinding of the tension member, and to diminish resistance to the rotation induced by the spring in rewinding the tension member.

2. A shock absorber comprising a drum, an attaching member upon which said drum is mounted to rotate, a tension member wound upon said drum and adapted to impart rotation thereto in one direction, a spring adapted to impart rotation to the drum in the opposite direction and rewind the tension member thereon, and a brake comprising frictional members carried, respectively, by the attaching member and the drum; said frictional members being constructed to increase their friction and thereby develop a progressively increasing resistance to the rotation of the drum imparted by the unwinding of the tension member, and to diminish frictional resistance to the rotation induced by the spring in rewinding the tension member.

3. A shock absorber comprising an attaching member adapted for mounting upon one of two relatively moving parts, a drum rotatably mounted on said attaching member and adapted for connection with the other of said relatively moving parts, a tension member wound upon and adapted to impart rotation to the drum by unwinding therefrom, a spring adapted to rotate the drum in the direction to rewind the tension member thereon, and a brake for resisting rotation of the drum comprising a cam surface and a frictional brake member coacting with said cam surface, mounted one upon the attaching member and the other upon the drum; said cam surface being inclined in the direction to progressively increase the frictional braking effect during the rotation imparted by the tension member and to relieve frictional braking effect during the rotation which rewinds the tension member.

4. In a device of the class described, the combination of a rotatable drum, a non-rotatable cam member, a spindle carrying the said drum and cam member, means for attaching the spindle to an automobile, a tension member winding on said drum, a leaf spring attached to the rim of said drum and in frictional contact with the cam member, and a flexible connection whereby the said drum is attached to another relatively movable part of an automobile.

5. In a device of the class described, the combination of a rotatable drum, a non-rotatable cam member, a spindle on which the rotatable drum and cam member are mounted, a bracket adapted to be attached to the frame of an automobile and carrying the spindle, a tension spring encircling the hub of the drum and having one of its ends attached to the bracket and the other secured to the drum, a leaf spring secured to the drum having its free end folded back into frictional contact with said cam, a reinforcing member for the said spring, and a flexible connection whereby the drum is secured to another relatively movable part of an automobile.

6. In a device of the class described, the combination of a rotatable drum, a non-rotatable cam member, a spindle on which the rotatable drum and cam member are mounted, a bracket adapted to be attached to the frame of an automobile and carrying the spindle, a tension spring encircling the hub of the drum and having one of its ends attached to the bracket and the other secured to the drum, a leaf spring secured to the drum having its free end folded back into frictional contact with said cam, a second leaf spring secured to the drum having its free end engaging the free end of the first-mentioned spring, and a flexible connection whereby the drum is secured to another relatively movable part of an automobile.

7. In a shock absorber, carrying members one of which moves relatively to the other, braking members mounted upon the respective carrying members, comprising a cam surface and a shoe, one of which slides upon the other to develop camming action during such relative movement of the carrying members, means yieldingly opposing said camming action to develop resistance to said relative movement, and a wall opposite the salient portion of the cam surface coacting with one of said braking members and limiting said relative movement.

8. In a shock absorber, carrying members one of which moves relatively to the other, braking members mounted upon the respective carrying members and comprising a cam surface and a shoe, one of which slides upon the other during such relative movement of the carrying members, means yieldingly pressing the shoe against the cam surface in the direction to oppose the camming action, and a wall opposed to the salient portion of the cam surface and coacting therewith to develop a restricted space into which the shoe is crowded toward the end of said relative movement.

9. In a shock absorber, a rotatable drum, a cam and coacting brake member, one of which rotates with said drum and the other of which resists such rotation, and a wall opposite said cam and developing with the latter a restricted space into which the brake member moves to increase its braking action; said brake member being resilient in the direction of confinement imposed by said space.

10. In a shock absorber, a rotatable drum, a cam and coacting brake member, one of which rotates with said drum and the other of which resists such rotation, and a wall opposite said cam and developing with the latter a restricted space into which the brake member moves to increase its braking action; said brake member comprising a volute spring having its end folded upon itself to develop a resilient shoe through which it bears upon said cam; and said cam and opposite wall being adapted to compress said folded end of the spring as the latter enters the reduced space between the cam and wall.

11. In a shock absorber, a mounting, a friction member supported by said mounting and having a radially presented cam surface, a drum rotatably supported on said mounting and having a wall surrounding said cam surface, and a volute spring secured to the wall of said drum and constructed to bear upon said cam surface and frictionally resist the rotation of the drum.

12. In a shock absorber, a mounting, a friction member supported by said mounting and having a radially presented cam surface, a drum rotatably supported on said mounting and having a wall surrounding said cam surface, and a volute spring secured to the wall of said drum and constructed to bear upon said cam surface and frictionally resist the rotation of the drum; said cam surface and the surrounding wall of the drum developing a reduced space near the salient point of the cam into which the bearing end of the spring is crowded by the rotation of the drum.

13. In a shock absorber, a fixed cam having a radially presented camming surface, a drum revoluble relatively to said cam, and a volute spring carried by said drum, extending circumferentially of the camming surface, and having its free end in frictional contact therewith.

14. In a shock absorber, a cam and its coacting brake shoe, and relatively rotatable members, one of which controls the cam and the other of which controls the brake shoe; said cam developing a gripping action upon said brake shoe; and the control of the brake shoe by said other member being resilient in the direction of relative rotation between the members.

15. In a shock absorber, a fixed cam having a radially presented camming surface, a drum revoluble relatively to said cam, and a volute spring carried by said drum, extending circumferentially of the camming surface, and having its free end in frictional contact therewith; the free end of said spring being folded upon itself to increase radial resiliency thereof.

16. In a shock absorber, a fixed cam having a radially presented camming surface, a drum revoluble relatively to said cam, and a volute spring carried by said drum, extending circumferentially of the camming surface, and having its free end in frictional contact therewith; the free end of said spring being folded upon itself to increase radial resiliency thereof; and said spring having a reinforcing means bearing upon its folded end.

17. A shock absorber comprising relatively rotatable members with means for imparting relative movement in one direction and a return spring for developing such relative rotation in the opposite direction, and braking means for resisting such relative rotation comprising a cam surface and a friction shoe bearing upon said cam surface; said cam surface having a limiting shoulder which limits rotation between the cam and the shoe under the action of the return spring.

Signed at Chicago, in the county of Cook, and State of Illinois, this 19th day of December, A. D., 1917.

JOHN W. BLACKLEDGE.